United States Patent
Bannon et al.

(10) Patent No.: US 8,413,924 B2
(45) Date of Patent: Apr. 9, 2013

(54) MOTOR ASSISTED FINE PITCH STARTUP RAM AIR TURBINE

(75) Inventors: David G. Bannon, Rockford, IL (US); Scott J. Marks, Oregon, IL (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 351 days.

(21) Appl. No.: 12/938,924

(22) Filed: Nov. 3, 2010

(65) Prior Publication Data
US 2012/0107086 A1 May 3, 2012

(51) Int. Cl.
*B64D 33/00* (2006.01)

(52) U.S. Cl.
USPC .......................................... 244/53 A; 290/52

(58) Field of Classification Search ............... 290/52; 244/53 A
See application file for complete search history.

(56) References Cited

U.S. PATENT DOCUMENTS

| | | | |
|---|---|---|---|
| 4,743,163 A | 5/1988 | Markunas et al. | |
| 5,122,036 A | 6/1992 | Dickes et al. | |
| 5,487,645 A | 1/1996 | Eccles | |
| 5,562,417 A | 10/1996 | Grimm et al. | |
| 5,685,694 A | 11/1997 | Jones et al. | |
| 5,779,446 A | 7/1998 | Althof et al. | |
| 5,899,411 A * | 5/1999 | Latos et al. ............... | 244/53 A |
| 6,145,308 A | 11/2000 | Bueche et al. | |
| 7,074,010 B2 | 7/2006 | DeGroff et al. | |
| 7,197,870 B2 * | 4/2007 | Bannon ........................... | 60/413 |
| 7,296,970 B2 | 11/2007 | Bannon et al. | |
| 7,306,430 B2 | 12/2007 | Russ | |
| 7,419,357 B2 | 9/2008 | Nohr et al. | |
| 7,513,119 B2 * | 4/2009 | Zielinski et al. ................ | 60/778 |
| 7,514,810 B2 * | 4/2009 | Kern et al. ...................... | 290/52 |
| 2006/0078430 A1 | 4/2006 | DeGroff et al. | |
| 2006/0239817 A1 | 10/2006 | Nohr et al. | |
| 2006/0263220 A1 | 11/2006 | Russ | |
| 2006/0280603 A1 | 12/2006 | Bannon et al. | |
| 2009/0226313 A1 | 9/2009 | Morimoto et al. | |
| 2010/0100300 A1 * | 4/2010 | Brooks et al. ................. | 701/102 |
| 2011/0315815 A1 * | 12/2011 | Finney ............................ | 244/58 |
| 2012/0107119 A1 * | 5/2012 | Bannon .......................... | 416/44 |

FOREIGN PATENT DOCUMENTS

| | | |
|---|---|---|
| EP | 0713008 A1 | 5/1996 |
| EP | 0713008 B1 | 1/2000 |
| EP | 2399829 A2 | 12/2011 |
| GB | 2072271 A | 9/1981 |
| WO | WO 9912810 A1 * | 3/1999 |

OTHER PUBLICATIONS

International Search Report; International Application No. GB1120723.0; International Filing Date Mar. 30, 2012; Date of Mailing; 4 pages.
International Search Report; International Application No. GB1120637.2; International Filing Date Mar. 29, 2012; Date of Mailing Apr. 3, 2012; 4 pages.

* cited by examiner

*Primary Examiner* — Joseph Waks
(74) *Attorney, Agent, or Firm* — Cantor Colburn LLP

(57) ABSTRACT

A startup assistance apparatus for a fine pitch Ram Air Turbine (RAT) is provided and includes a generator to provide motive power to the RAT when operating in a first mode and to generate electricity from RAT operation when operating in a second mode and a control unit, including a speed sensing unit configured to sense an operating condition of the generator and a controller operably coupled to the generator and configured to control the generator to operate in the first or the second mode based on the sensed operating condition.

20 Claims, 4 Drawing Sheets

MOTOR ASSISTED FINE PITCH STARTUP RAM AIR TURBINE

BACKGROUND OF THE INVENTION

The subject matter disclosed herein relates to a Ram Air Turbine (RAT) and, more particularly, a motor assisted fine pitch startup RAT.

The latest generations of RATs are designed to operate with an initial blade pitch, which is in the range of 5 to 15 degrees with respect to an axis perpendicular to the flow direction of incoming air. This initial blade pitch angle is chosen to maximize performance of the RAT during landing when the demands on the RAT are at high levels but the available energy in the airstream is low.

FIG. 1 shows the start up and steady state performance comparison between setting the initial blade pitch at a small blade pitch angle and at a large blade pitch angle. As shown in FIG. 1, using a small blade pitch angle, such as 9 degrees, for the initial blade pitch fails to provide an optimum amount of torque for allowing the RAT to start from 0 rpm under low airspeed conditions since the torque produced by the RAT at that blade pitch is lower than the load torque. That is, the small fine pitch blade angle has less torque at low speeds than a relatively larger blade angle and this low torque results in small torque margins compared to the turbine resisting torque and the result is relatively long start times for the RAT. These long start times create controllability issues for the aircraft that must be countered with larger batteries and or hydraulic accumulators.

At steady state operating speeds, for example at approximately 5000 RPM in FIG. 1, the smaller blade angle provides more torque than the larger blade angle. Consequently in FIG. 1, the 9 degree angle would be preferred over the 15 degree angle at steady state operating speeds.

Given the low speed versus operating speed characteristics of a fine pitch startup RAT, RATs designed with a low initial blade angle ("fine pitch start RAT") typically must trade off steady state performance versus startup performance. This trade off results in larger turbines, lower performance and/or slower start times.

This issue has been addressed by the use of mechanisms that allow the RAT to start at a larger blade angle (coarse pitch start RAT) with a transition back to a fine angle at an intermediate turbine speed. After this transition occurs, the RAT reverts to normal operation like any other fine pitch RAT. However, these mechanisms allowing the RAT to start in coarse pitch and then transition to fine pitch increase the weight and size of the turbine while decreasing reliability.

BRIEF DESCRIPTION OF THE INVENTION

According to one aspect of the invention, a startup assistance apparatus for a fine pitch Ram Air Turbine (RAT) is provided and includes a generator to provide motive power to the RAT when operating in a first mode and to generate electricity from RAT operation when operating in a second mode and a control unit, including a speed sensing unit configured to sense an operating condition of the generator and a controller operably coupled to the generator and configured to control the generator to operate in the first or the second mode based on the sensed operating condition.

According to another aspect of the invention, a startup assistance apparatus for a fine pitch Ram Air Turbine (RAT) of an aircraft having aircraft electrical loads is provided and includes a generator, which is operable as a motor in a first mode whereby the generator provides motive power to the RAT and which is operable in a second mode whereby the generator provides electricity to the aircraft loads and a control unit, including a speed sensing unit configured to sense an operating condition of the generator and a controller operably coupled to the generator and configured to control the generator to operate in the first or the second mode based on the sensed operating condition.

According to yet another aspect of the invention, a method of operating a startup assistance apparatus for a fine pitch Ram Air Turbine (RAT) is provided and includes sensing an operational condition of a generator, controlling the generator to operate in a first mode whereby the generator provides motive power to the RAT when the sensing indicates that the generator is operating at a frequency less than a predefined operating frequency thereof and controlling the generator to operate in a second mode whereby the generator generates electricity from RAT operation when the sensing indicates that the generator is operating at a frequency greater than a predefined operating frequency thereof.

These and other advantages and features will become more apparent from the following description taken in conjunction with the drawings.

BRIEF DESCRIPTION OF THE DRAWING

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Many new RATs are designed to drive a generator, or a generator and a pump, such as a hybrid RAT. The presence of the generator can be employed for providing startup assistance to a fine pitch RAT.

Figure 1:
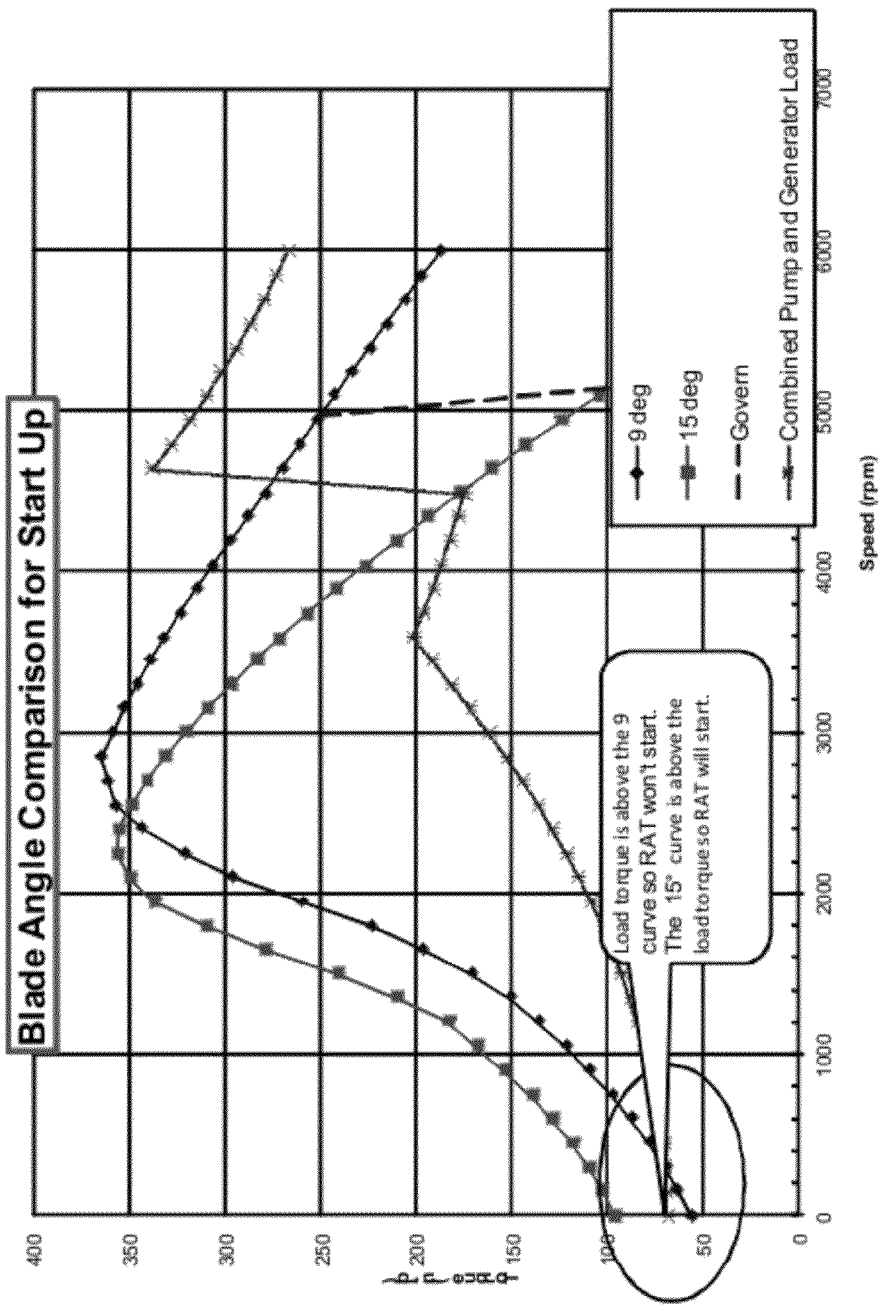
FIG. 1 is a graph of a blade angle comparison for startup performance of a fine pitch start up RAT.
Figure 2:
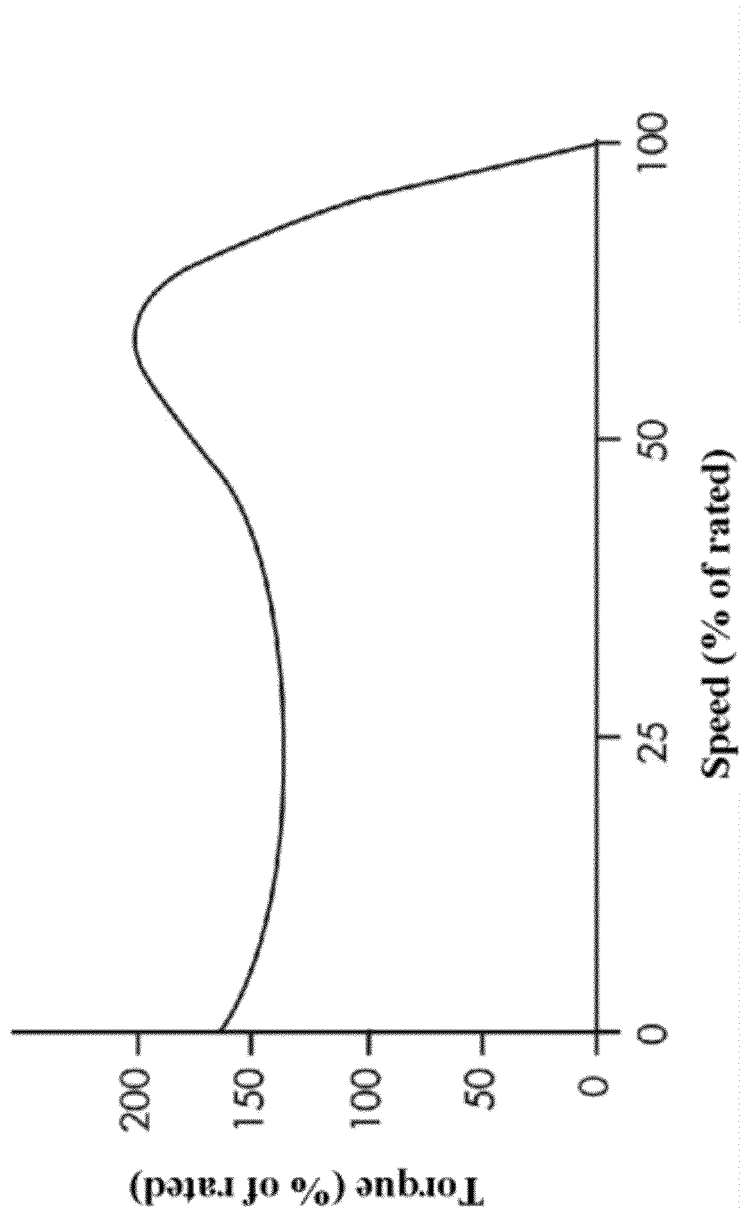
FIG. 2 is a graph of induction motor characteristics.

With reference to FIGS. 1 and 2, since a function of most generator or hybrid RATs is to charge a set of batteries on an aircraft, the energy stored in the batteries can be used to assist RAT startup. Beginning at 0 RPM, a controller or a motor drive can be used to convert the RAT generator into a motor, such as an induction motor, until the RAT generator/motor reaches a designated intermediate RPM. At a slightly higher rpm sensed by, for example, a generator frequency sensor, the generator/motor is switched back to generator mode and operates like any other RAT. The energy demand on the aircraft batteries during startup is low because the duration of the motor mode is a maximum of approximately 2 seconds. Also, as shown in FIG. 2, due to torque characteristics of the generator when operated as an induction motor, the torque of the motor is relatively large at low RPMs. This relatively large motor torque will add to the turbine torque during start up which will allow the RAT to start much faster and, additionally, the initial blade angle of the turbine can now be chosen to optimize steady state performance without regard for startup performance. As shown in FIG. 1, it is seen that the generator torque, when it is added to the torque produced by the fine pitch RAT at a 9 degree blade pitch angle, is sufficient to provide the RAT with the necessary startup torque as the combined pump and generator load torque is only slightly higher than the torque produced by the fine pitch RAT at the 9 degree blade pitch angle.

Figure 3:
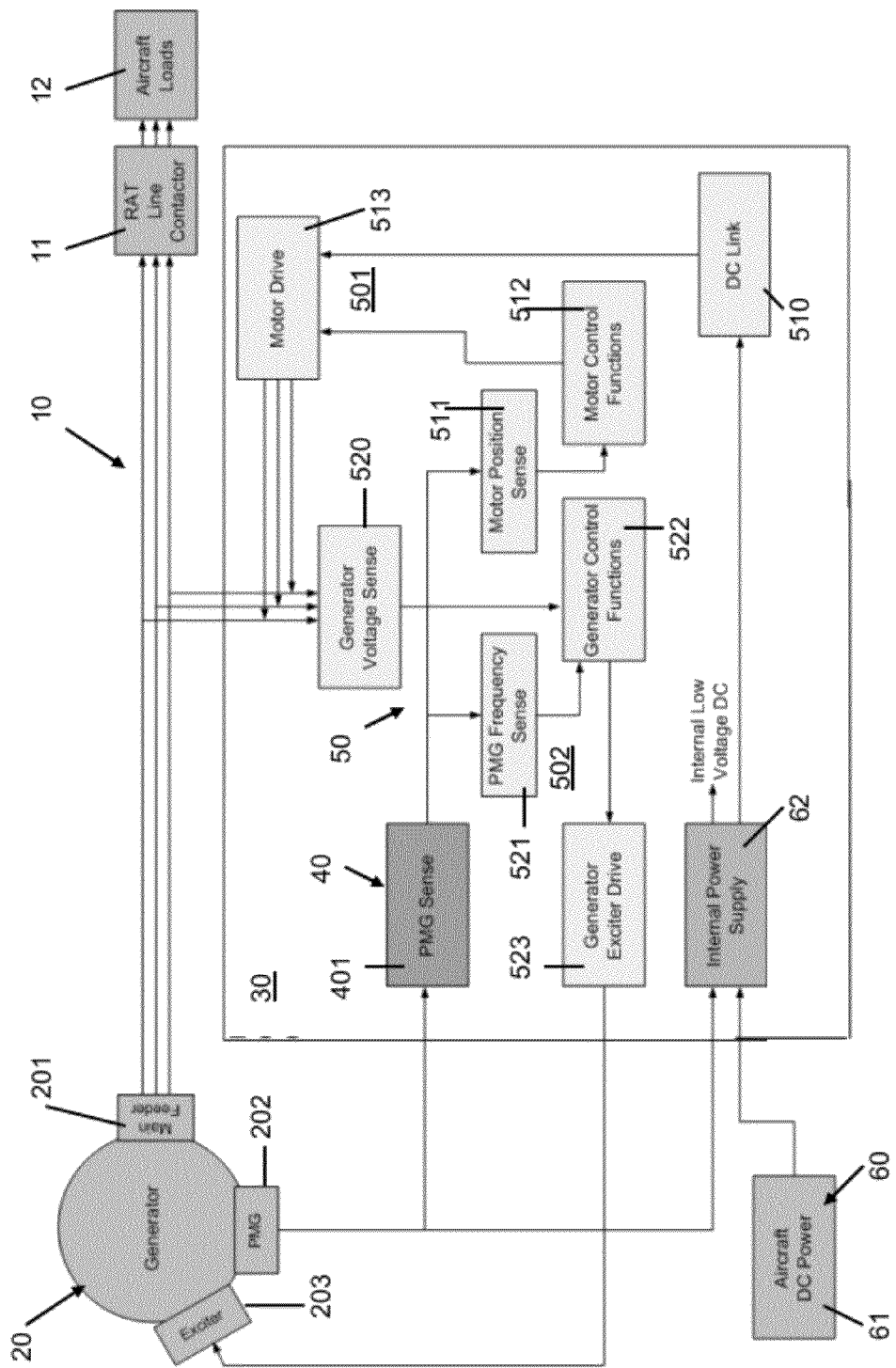
FIG. 3 is a schematic diagram of a motor assisted fine pitch startup RAT.

In accordance with aspects of the invention and, with reference to FIG. 3, a startup assistance apparatus 10 for a fine pitch Ram Air Turbine (RAT) of an aircraft is provided. The apparatus 10 includes a RAT line contactor 11, which is operably coupled to a fine pitch startup RAT, aircraft loads 12, such as aircraft electrical components, a generator 20 and a control unit 30. The generator 20 is operable in first and second modes. When operating in the first mode, the generator 20 acts as a motor and provides motive power to the RAT. By contrast, when operating in the second mode, the generator 20 acts as a generator and is driven by rotation of the RAT to provide electricity to the aircraft loads 12 via the RAT line contactor 11. In some embodiments, the RAT line contactor 11 and the aircraft loads 12 are sequentially connected in series with the generator 20.

The control unit 30 includes a speed sensing unit 40 and a controller 50. The speed sensing unit 40 is configured to sense an operating condition of the generator 20. The controller 50 is operably coupled to the generator 20 and configured to control the generator 20 to operate in the first or the second mode based on the sensed operating condition. In accordance with embodiments, the sensed operating condition may be an operating frequency of the generator 20. In these cases, the controller 50 controls the generator 20 to operate in the first mode when the generator frequency is less than ½ of a steady operating frequency of the generator 20 and to operate in the second mode when the generator frequency is greater than ½ the steady operating frequency. It is to be understood that this is merely exemplary and, in accordance with further embodiments, other conditions may be sensed. These include an operational speed of the RAT, measured RAT RPMs and/or a combination of these and similar conditions.

The apparatus 10 further includes a power source 60 to provide motive power to the generator 20 when the generator 20 operates in the first mode and acts as a motor for the RAT. The power source 60 includes a direct current (DC) power source 61 of the aircraft, which is disposed external from the control unit 30 and may be provided as a battery or a similar power storage unit. The power source 60 further includes an internal power supply unit 62, which resides within the control unit 30 and which receives power from the DC power source 61 and the generator 20.

The generator 20 includes a main feeder unit 201, a permanent magnet generator (PMG) 202 and an exciter unit 203. The main feeder unit 201 receives a 3 phase voltage from the motor drive 513 (to be described further below) to provide motive power to the RAT when the generator 20 operates in the first mode. The main feeder unit 201 further provides the output voltage as electricity to the aircraft loads 12 when the generator 20 operates in the second mode. The PMG 202 generates electricity at least when the generator 20 operates in the second mode and acts as a signal generator for the motor position sensor 511 (to be described further below) when the generator 20 operates in the first mode.

The speed sensing unit 40 may include a PMG sensor 401, which is operably coupled to the PMG 202 of the generator 20. The PMG sensor 401 is thereby configured to sense an operating frequency of the generator 20. As mentioned above, the speed sensing unit 40 may include other additional sensors, which are further configured to sense additional operational conditions of the generator 20, the RAT and/or other components associated with the generator 20 and/or the RAT.

The controller 50 includes a motor drive circuitry module 501 and an electricity generating module 502. The motor drive circuitry module 501 controls the generator 20 to provide the RAT with the motive power when the generator 20 operates in the first mode and acts as a motor. The electricity generating module 502 controls the generator 20 to generate electricity for the aircraft loads 12 when then generator 20 operates in the second mode.

The motor drive circuitry module 501 includes a DC link unit 510, which is coupled to the internal power supply unit 62, by which the motor drive circuitry module 501 provides the generator 20 with power when the generator 20 operates in the first mode. While this taxes the DC power source 61, the amount of time the generator 20 should require power is relatively short (i.e., only about 2 seconds), so the total drain from the DC power source 61 is limited.

The motor drive circuitry module 501 further includes a motor position sensor unit 511, which is coupled to the PMG sensor 401, and a motor control functions unit 512, which is coupled to the motor position sensor unit 511. The serial coupling of the motor position sensor unit 511 and the motor control functions unit 512 with the PMG sensor 401 allows the motor drive circuitry module 501 to monitor a driving state of the generator 20 when the generator 20 operates in the first mode and acts like a motor for the RAT. Respective outputs of the motor control functions unit 512 and the DC link unit 510 are provided in parallel to the motor drive unit 513, such as a processing unit that evaluates a condition of the generator 20. The motor drive unit 513 determines whether the generator 20 should be operating in the first mode in accordance with the evaluation and issues a second voltage signal, S2, such as a three-part voltage signal, in accordance with results of that evaluation.

The electricity generating module 502 includes a generator voltage sensor unit 520, a PMG frequency sensor unit 521, a generator control functions unit 522 and a generator exciter drive 523. The generator voltage sensor unit 520 senses the output voltage of the main feeder unit 201 of the generator 20. The PMG frequency sensor unit 521 is receptive of results of the sensing of the PMG sensor 401 and outputs second data reflective of those results. The generator control functions unit 522 may be a processing unit that evaluates a condition of the generator 20 and is receptive of the first and second data in parallel by which such evaluation is conducted. The generator control functions unit 522 thereby determines whether the generator 20 should be operating in the second mode in accordance with that evaluation and issues a command to run the generator 20 as an electricity generator for the aircraft loads 12 to the generator exciter drive 523. The generator exciter drive 523 is operably coupled to the exciter unit 203 and instantiates the exciter unit 203 upon reception of the command.

In accordance with embodiments, the motor position sensor 511 of the motor drive circuitry module 501 and the PMG frequency sensor unit 521 of the electricity generating module 502 are provided in parallel with respect to the PMG sensor 401. With that arrangement, the PMG sensor 401 may be configured to send frequency data to the motor drive circuitry module 501 only when such data indicate that the generator 20 should be run in the first mode and to send frequency data to the electricity generating module 502 only when the generator 20 should be run in the second mode. In at least this way, the generator 20 can be switched between the first mode of operation and the second mode of operation.

Figure 4:
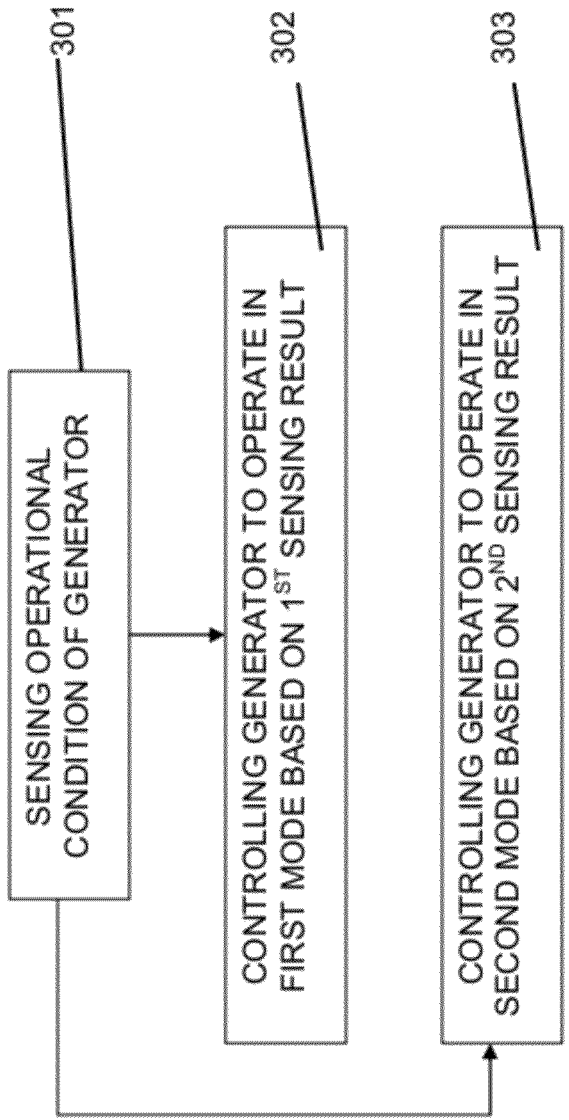
FIG. 4 is a flow diagram illustrating a method of operation the motor assisted fine pitch start up RAT of FIG. 3.

In accordance with further aspects of the invention and, with reference to FIG. 4, a method of operating a startup assistance apparatus for a fine pitch Ram Air Turbine (RAT) is provided. The method includes sensing an operational condition of a generator (301), controlling the generator to operate in a first mode whereby the generator provides motive power to the RAT when the sensing indicates that the generator is operating at a frequency less than a predefined operating frequency thereof (302) and controlling the generator to operate in a second mode whereby the generator generates electricity from RAT operation when the sensing indicates that the generator is operating at a frequency greater than the predefined operating frequency thereof (303). As mentioned above, the predefined operating frequency thereof may be ½ the steady operating frequency of the generator 20 or some other similar level. In accordance with various embodiments, the steady operating frequency may be a rated operating frequency for the generator 20, a historically steady operating frequency and/or a historically steady operating frequency in various conditions.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A startup assistance apparatus for a fine pitch Ram Air Turbine (RAT), the apparatus comprising:
    a generator to provide motive power to the RAT when operating in a first mode and to generate electricity from RAT operation when operating in a second mode; and
    a control unit, including a speed sensing unit configured to sense an operating condition of the generator and a controller operably coupled to the generator and configured to control the generator to operate in the first or the second mode based on the sensed operating condition.

2. The apparatus according to claim 1, wherein rotation of the RAT drives the generator to generate electricity when the generator operates in the second mode.

3. The apparatus according to claim 1, wherein the sensed operating condition is a generator frequency.

4. The apparatus according to claim 3, wherein the controller controls the generator to operate in the first mode when the generator frequency is less than ½ a steady operating frequency thereof and in the second mode when the generator frequency is greater than ½ the steady operating frequency thereof.

5. The apparatus according to claim 1, further comprising a power source to provide motive power to the generator when the generator operates in the first mode.

6. The apparatus according to claim 5, wherein the power source comprises a direct current (DC) power source of an aircraft.

7. The apparatus according to claim 6, wherein the power source further comprises an internal power supply coupled to the generator and the DC power source.

8. The apparatus according to claim 1, wherein the generator comprises:
    a main feeder unit to provide motive power to the RAT when the generator operates in the first mode and to provide electricity to aircraft loads when the generator operates in the second mode; and
    a permanent magnet generator (PMG) to generate electricity when the generator operates in the second mode.

9. The apparatus according to claim 1, wherein the speed sensing unit comprises a permanent magnet generator (PMG) sensor operably coupled to the generator to sense a generator frequency.

10. The apparatus according to claim 9, wherein the controller comprises:
    a motor drive circuitry module to control the generator to provide the RAT with the motive power when operating in the first mode; and
    an electricity generating module to control the generator to generate electricity when operating in the second mode,
    the motor drive circuitry and electricity generating modules being respectively coupled to the PMG sensor in parallel.

11. A startup assistance apparatus for a fine pitch Ram Air Turbine (RAT) of an aircraft having aircraft electrical loads, the apparatus comprising:
    a generator, which is operable as a motor in a first mode whereby the generator provides motive power to the RAT and which is operable in a second mode whereby the generator provides electricity to the aircraft loads; and
    a control unit, including a speed sensing unit configured to sense an operating condition of the generator and a controller operably coupled to the generator and configured to control the generator to operate in the first or the second mode based on the sensed operating condition.

12. The apparatus according to claim 11, wherein the sensed operating condition is a generator frequency.

13. The apparatus according to claim 12, wherein the controller controls the generator to operate in the first mode when the generator frequency is less than ½ a steady operating frequency thereof and in the second mode when the generator frequency is greater than ½ the steady operating frequency thereof.

14. The apparatus according to claim 11, further comprising a power source to provide motive power to the generator when the generator operates in the first mode.

15. The apparatus according to claim 14, wherein the power source comprises a direct current (DC) power source of the aircraft.

16. The apparatus according to claim 15, wherein the power source further comprises an internal power supply coupled to the generator and the DC power source.

17. The apparatus according to claim 11, wherein the generator comprises:
    a main feeder unit to provide motive power to the RAT when the generator operates in the first mode and to provide electricity to the aircraft loads when the generator operates in the second mode; and
    a permanent magnet generator (PMG) to generate electricity when the generator operates in the second mode.

18. The apparatus according to claim 11, wherein the speed sensing unit comprises a permanent magnet generator (PMG) sensor operably coupled to the generator to sense a generator frequency.

19. The apparatus according to claim 18, wherein the controller comprises:
    a motor drive circuitry module to control the generator to provide the RAT with the motive power when operating in the first mode; and an electricity generating module to control the generator to generate electricity when operating in the second mode, the motor drive circuitry and electricity generating modules being respectively coupled to the PMG sensor in parallel.

20. A method of operating a startup assistance apparatus for a fine pitch Ram Air Turbine (RAT), the method comprising:

sensing an operational condition of a generator;

controlling the generator to operate in a first mode whereby the generator provides motive power to the RAT when the sensing indicates that the generator is operating at a frequency less than a predefined operating frequency thereof; and controlling the generator to operate in a second mode whereby the generator generates electricity from RAT operation when the sensing indicates that the generator is operating at a frequency greater than a predefined operating frequency thereof.

* * * * *